Oct. 8, 1940.  V. E. ROYLE  2,216,832
APPARATUS FOR EXTRUDING TUBES
Filed July 28, 1937   2 Sheets-Sheet 1
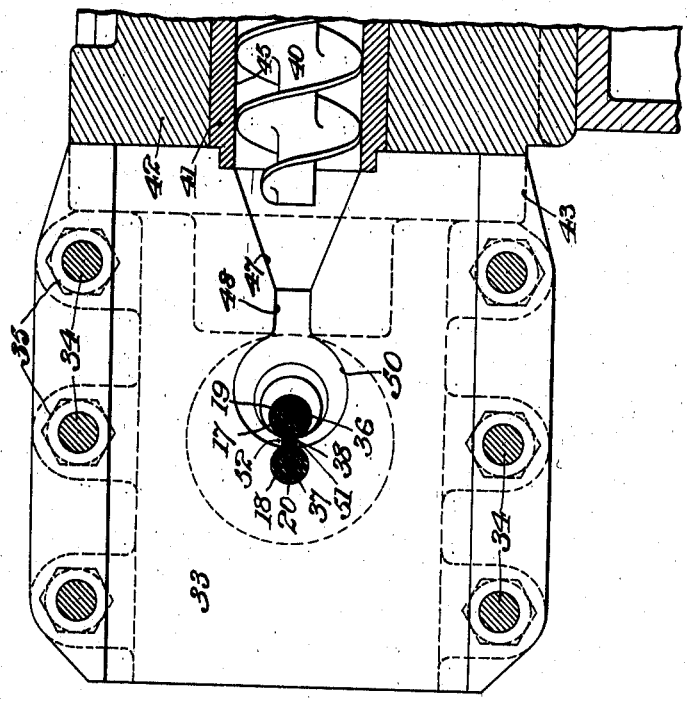
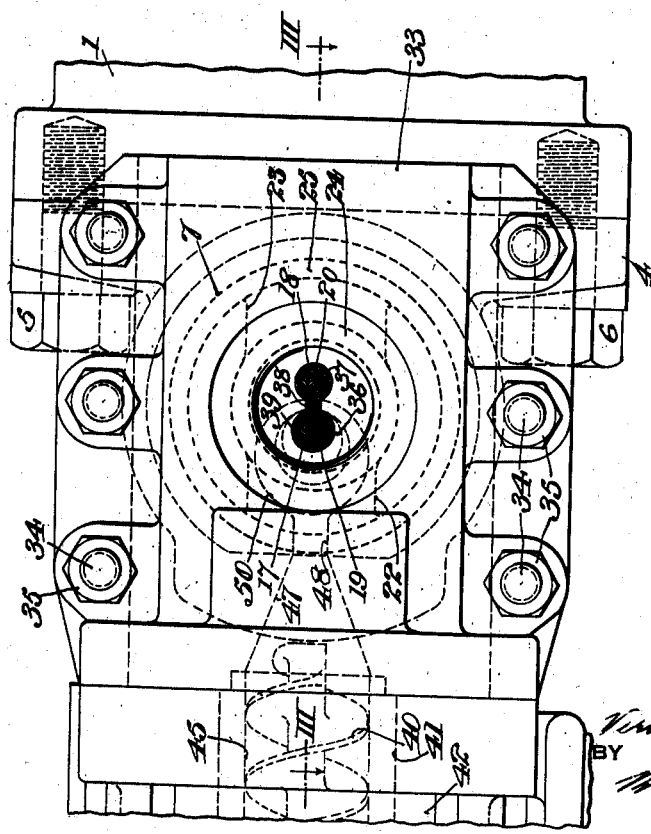
INVENTOR
Vernon E. Royle
BY
ATTORNEYS Oct. 8, 1940. V. E. ROYLE 2,216,832
APPARATUS FOR EXTRUDING TUBES
Filed July 28, 1937 2 Sheets-Sheet 2
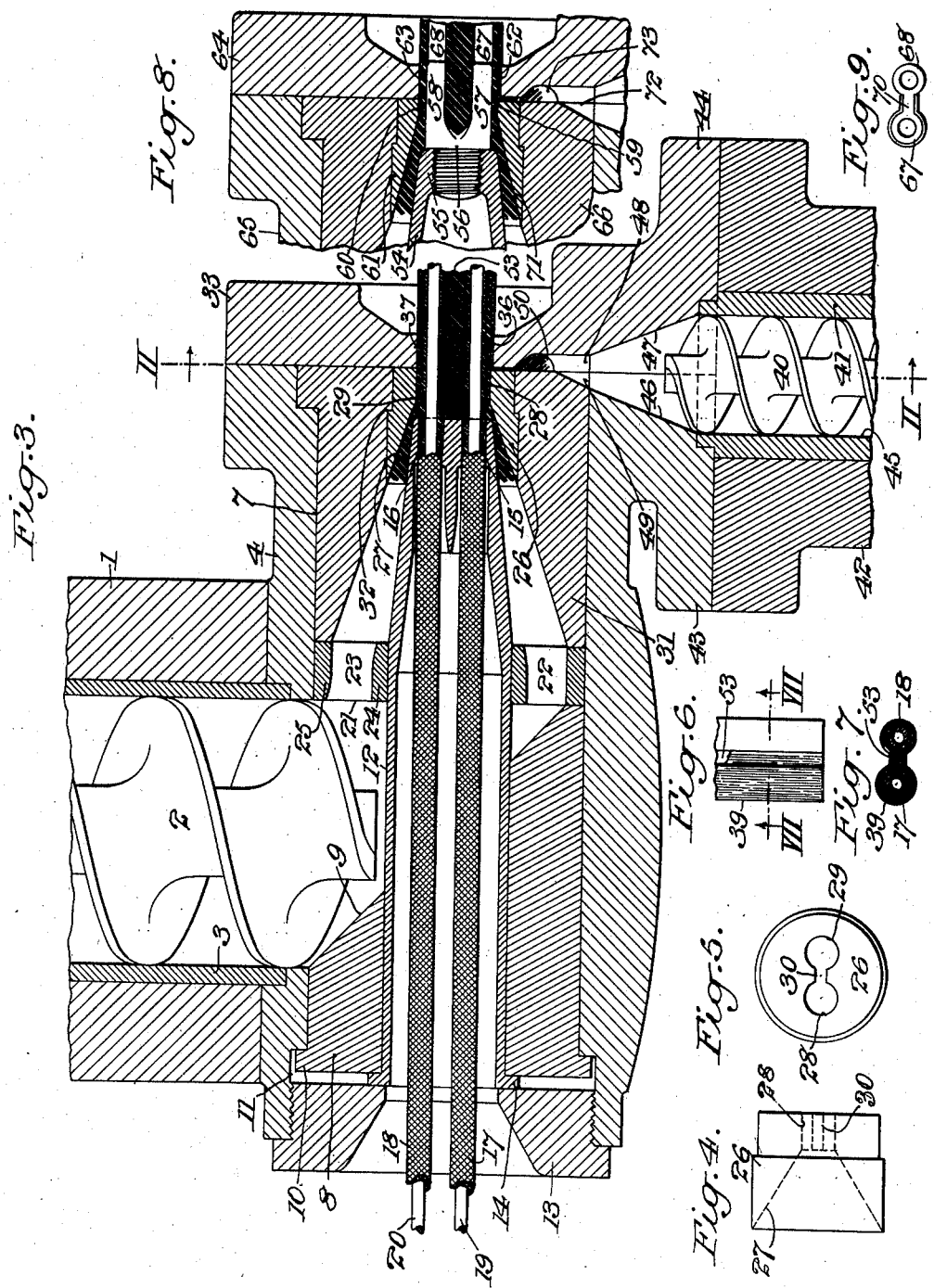
INVENTOR
Vernon E. Royle
BY
ATTORNEYS Patented Oct. 8, 1940

2,216,832

UNITED STATES PATENT OFFICE 2,216,832

APPARATUS FOR EXTRUDING TUBES

Vernon E. Royle, Paterson, N. J.

Application July 28, 1937, Serial No. 156,257

4 Claims. (Cl. 18—14)

This invention relates to apparatus for extruding tubes and more particularly to forming tubes joined in parallel relation.

In tubing, where long lengths are employed to convey fluids of different character from the source of supply to a machine or portable tool, it is quite important and necessary that each tube designate its particular fluid throughout its length so as to be readily perceived and connected to the proper part of the machine or tool.

It is the object of the present invention to provide an apparatus capable of simultaneously extruding a plurality of tubes and applying on the surface of one or more of the tubes another layer of plastic material of a different character or color to form a definite designation between the tubes.

The invention contemplates the provision of an apparatus in which the material is fed to the die forming the tubes from one source and the covering applied directly to one or more of the formed tubes at a point adjacent the tube forming dies from another source.

A practical embodiment of my invention is represented in the accompanying drawings, in which Fig. 1 represents a front elevation of my improved apparatus showing two separately formed tubes on mandrels being fed to the dies and forming cores upon which the product is built;

Fig. 2 represents a vertical section taken in the plane of the line II—II of Fig. 3 looking in the direction of the arrows;

Fig. 3 represents a horizontal section taken in the plane of the line III—III of Fig. 1 looking in the direction of the arrows;

Fig. 4 represents a side elevation of the tube forming dies;

Fig. 5 represents an end elevation of the same;

Fig. 6 represents a plan view of a piece of tubing formed by the apparatus;

Fig. 7 represents a vertical section taken in the plane of the line VII—VII of Fig. 6 looking in the direction of the arrows;

Fig. 8 represents a detail horizontal section, similar to Fig. 3, showing a modified form of tube forming guider and core; and Fig. 9 represents an end view of the tubing formed by said modified form of apparatus.

In Figs. 1 to 7 inclusive the apparatus shown is, in part, ordinarily similar to wire insulating machines insofar as the main cylinder denoted by 1, its means for supplying plastic material, such as a rubber compound, and stock screw or plodder 2 within the cylinder for advancing the material, are concerned. The cylinder 1 is provided with the usual bore liner 3 in which the stock screw 2 works.

A cylindrical head 4 is secured to the cylinder 1 by bolts 5, 6 (Fig. 1). The cylindrical head 4 has a longitudinal bore 7 disposed transversely to the longitudinal axis of the screw 2 and is provided at one end with a guider support 8 having a flat angular face 9. This guider support 8 is also provided with an annular flange 10 which is seated in a recess 11 of the longitudinal bore 7. A tubular guider 12 is fixed in the support 8 by means of a hollow nut 13 screw threaded in the end of the bore 7, which nut engages a peripheral flange 14 of the guider. The tip of the guider 12 is provided with reduced bores 15, 16 through which the previously formed tubes 17, 18 with their respective mandrels 19, 20 are passed to be covered with plastic material and joined together. This guider tip constitutes, in effect, a core for the plastic material and it is supported by a core bridge 21 that is circular in cross section and snugly fitted within the bore 7. A pair of arms 22, 23 connect the hub 24 of the core bridge 21 with the annular rim 25 thereof and said hub directly supports the guider tip or core. A die 26 has a frusto-conical opening 27 which surrounds the guider tip and is developed into two cylindrical openings 28, 29, which are connected by a narrow passage 30, see Figs. 4 and 5. The die 26 is fixed in a die holder 31 which in turn is snugly fitted in the longitudinal bore 7 of the head 4. The die holder is shouldered to engage the die as indicated at 32; and the end of the holder abuts the core bridge 21, while a portion of the rim of the core bridge abuts the end of the guider support 8 adjacent the flat angular face 9. A face plate 33 is secured to the cylindrical head 4 by means of stud bolts 34 and nut 35. This face plate 33 serves to secure the die holder 31 and adjacent parts in the cylindrical bore 7 and has two cylindrical openings 36, 37 connected by a straight passage 38, see Figs. 1 and 2, which openings and passage register with the openings 28, 29 and passage 30 of the die 26. The opening 36 has a slightly larger diameter than the registering opening 28, while the passage 38 is also slightly larger than the passage 30 with which it registers. The increased diameter and width of the opening 37 and passage 38 is provided for the admittance of a plastic material of another character or color denoted by 39, the supply of which is furnished and advanced thereto by means of a stock screw or worm 40 working in a liner 41 fixed in the bore of the cylinder 42. The cylinder 42 is secured to the flange 43 of the cylindrical head 4 and flange 44 of the face plate 33 in any well known or approved manner. The liner 41 is shouldered in the flange 43 of the head 4 and the flange 44 of the face plate 33, while the interior bore 45 registers with a conical opening, one half 46 of which is formed in the cylindrical head 4 and the other half 47 in the face plate 33. The conical opening houses the end of the stock screw 40 and connects with a passage 48 in the face plate 33 and a tapered groove 49 in the holder 31, which passage 48 is developed into a crescent shaped channel 50, the ends 51, 52 of which lead to the straight passage 38. This crescent shaped channel 50 is formed in the face plate 33 and co-operates with the face of the die 26 and its holder 31 to conduct the plastic material around the covered tube 17 and the web which connects the covered tubes together.

In operation, the preformed tubes 17, 18 with their respective mandrels 19, 20 therein are passed through the cylindrical head 4 from left to right, Fig. 3, directly traversing the hollow nut 13, tubular guider 12, reduced bores 15, 16, frusto-conical opening 27, cylindrical openings 28, 29 and thence through cylindrical openings 36, 37 in the face plate 33. The plastic material such as rubber compound or other similar material is extruded by the stock screw 2, which material is directed by the flat angular face of the guider support 8 around the guider, through the core bridge 21, and applied to the tubes 17, 18 at the tip of the guider and the point where the latter passes through the openings 28, 29 respectively. Simultaneously, the tubes 17, 18, while being covered with the plastic material, are also joined by a web 53 of plastic material formed therebetween by the straight passage 30. When the tubes 17, 18 enter the openings 36, 37 in the face plate 33, the tube 17 and the web 53 receive a relatively thin covering of rubber compound or other similar material of another character or color that is extruded by the stock screw 40, which material passes from the end of the screw through the conical opening 46, 47, passage 48, tapered groove 49 to the crescent shaped channel 50 which directs the material around the covered tube 17 and also coats the web 53 by passing from the reduced ends of the channel 50. After this treatment the tubes pass through the cylindrical openings 36, 37 and straight passage 38 in the face plate 33. The covered tubes and web thereafter continue their movement and are handled in any well known or approved manner.

In referring to the modified form shown in Fig. 8 and the product thereof in Fig. 9, it may be said that this form is particularly desirable for the direct forming of a plurality of tubes, one or more of the tubes having a coating for specific designation, without the use of separate preformed tubes and mandrels, where additional strength, durability and rigidity are not desired but flexibility is most advantageous.

In this modified form the guider 54 is provided with a tip 55 screw threaded to receive a removable mandrel 56 having solid cylindrical cores 57, 58 extending outwardly therefrom through the cylindrical openings 59, 60 in the die 61 and the cylindrical openings in the face plate 64. The cylindrical head 65, the die holder 66, the die 61 and the face plate 64 are formed and arranged similar to those described in referring to Figs. 1 to 3 inclusive. The plastic material, such as rubber compound or other similar material, is also extruded in the manner above described and the tubes 67, 68 with their connecting web 70, are formed at the tip 55 of the guider 54 in the frusto-conical opening 71 in the die 61 while passing through the cylindrical openings 59, 60 in the die. When the tubes 67, 68 enter the openings 62, 63 in the face plate 64, the tube 67 and web 70 receive a relatively thin covering of rubber compound or other similar material of another character or color which is extruded in the manner described in referring to Figs. 1 to 3 inclusive. This plastic material is directed to the tapered groove and passage 72 and the crescent shaped channel 73 from whence it passes to the tube 67 and web 70.

It is evident that various changes may be resorted to in the form, construction and arrangement of the several parts without departing from the spirit and scope of my invention; and hence, I do not intend to be limited to the details herein shown and described except as they may be included in the claims.

What I claim is:

1. An apparatus of the character described comprising, a common means for extruding a plurality of tubes spaced apart in parallel relation and having a flat connecting web therebetween, and a stock screw extruding means having a passage therefrom progressively diminishing in area and a crescent shaped channel connected to said passage, said channel being arranged to surround the exterior surface of at least one of the tubes for simultaneously applying a covering thereto, said means being disposed at an angle to the longitudinal direction of movement of the tubes.

2. An apparatus of the character described comprising, a common means for extruding a plurality of tubes spaced apart in parallel relation and having a flat connecting web therebetween, and a stock screw extruding means having a passage therefrom progressively diminishing in area and a crescent shaped channel connected to said passage, said channel being arranged to surround the exterior surface of at least one of the tubes and its web for simultaneously applying a covering thereto, said means being disposed at an angle to the longitudinal direction of movement of the tubes.

3. An apparatus of the character described comprising, a common means for extruding a plurality of tubes spaced apart in parallel relation and having a flat connecting web therebetween, and a stock screw extruding means having a crescent shaped channel arranged to surround the exterior surface of at least one of the tubes for applying a covering thereto, said means being disposed at an angle to the longitudinal direction of movement of the tubes.

4. An apparatus of the character described comprising, a common means for extruding a plurality of tubes spaced apart in parallel relation and having a flat connecting web therebetween, and a stock screw extruding means having a crescent shaped channel arranged to surround the exterior surface of at least one of the tubes and its web for applying a covering thereto, said means being disposed at an angle to the longitudinal direction of movement of the tubes.

VERNON E. ROYLE.